(12) United States Patent
Cerniway et al.

(10) Patent No.: US 10,788,094 B2
(45) Date of Patent: Sep. 29, 2020

(54) APPARATUS AND METHOD FOR VIBRATION MITIGATION WITH DYNAMIC VIBRATION ABSORBER

(71) Applicant: SERCEL, INC., Houston, TX (US)

(72) Inventors: Matthew Cerniway, Katy, TX (US); Michael Maples, Houston, TX (US); Gaetan Mellier, Houston, TX (US)

(73) Assignee: SERCEL, INC., Houston, TX (US)

( * ) Notice: Subject to any disclaimer, the term of this patent is extended or adjusted under 35 U.S.C. 154(b) by 350 days.

(21) Appl. No.: 15/802,621

(22) Filed: Nov. 3, 2017

(65) Prior Publication Data

US 2018/0051770 A1 Feb. 22, 2018

Related U.S. Application Data

(63) Continuation-in-part of application No. 14/509,137, filed on Oct. 8, 2014, now Pat. No. 9,909,640.

(51) Int. Cl.
*G01V 1/20* (2006.01)
*F16F 15/02* (2006.01)
*B63B 21/66* (2006.01)

(52) U.S. Cl.
CPC ............ *F16F 15/022* (2013.01); *G01V 1/201* (2013.01); *B63B 21/66* (2013.01); *G01V 2001/205* (2013.01)

(58) Field of Classification Search
CPC . F16F 15/022; G01V 1/201; G01V 2001/205; B63B 21/56; B63B 21/66
See application file for complete search history.

(56) References Cited

U.S. PATENT DOCUMENTS

| | | |
|---|---|---|
| 3,930,254 A | 12/1975 | Pavey, Jr. |
| 4,090,168 A | 5/1978 | Miller et al. |
| 4,628,851 A | 12/1986 | Appling |
| 4,660,183 A | 4/1987 | McGowan et al. |
| 4,689,774 A | 8/1987 | Cameron |
| 5,062,085 A | 10/1991 | Andrews, Jr. |
| 5,471,436 A | 11/1995 | Harvey |
| 5,641,248 A | 6/1997 | Arlt, III |
| 7,184,366 B1 | 2/2007 | Harrick et al. |

(Continued)

FOREIGN PATENT DOCUMENTS

| | | | |
|---|---|---|---|
| EP | 0171936 A2 | 2/1986 | |
| WO | WO-2014036596 A1 * | 3/2014 | ............... G01V 1/38 |

OTHER PUBLICATIONS

Office Action in related/corresponding Chinese Application No. 201510639477.9, dated May 21, 2019.

(Continued)

*Primary Examiner* — Ian J Lobo
(74) *Attorney, Agent, or Firm* — Patent Portfolio Builders PLLC

(57) ABSTRACT

Method and dynamic vibration absorber device for reducing a resonant frequency of a node to which the dynamic vibration absorber device is attached to. The dynamic vibration absorber device includes a housing configured to be attached to the node; an absorber mass located inside the housing; and first and second diaphragms attached to the housing and configured to suspend the absorber mass inside the housing. The dynamic vibration absorber device changes a resonant frequency of the node to two smaller vibration peaks.

18 Claims, 11 Drawing Sheets

(56) References Cited

U.S. PATENT DOCUMENTS

| | | | |
|---|---|---|---|
| 9,057,798 B2 | 6/2015 | Juhasz et al. | |
| 2004/0013036 A1 | 1/2004 | Fageras et al. | |
| 2008/0008047 A1* | 1/2008 | Lunde | G01V 1/201 367/154 |
| 2009/0147621 A1* | 6/2009 | Hegna | G01V 1/364 367/24 |
| 2012/0049422 A1 | 3/2012 | Gnateski | |
| 2013/0114374 A1 | 5/2013 | Juhasz et al. | |
| 2015/0234064 A1* | 8/2015 | Wallace | G01V 1/38 367/20 |

OTHER PUBLICATIONS

Chinese Office Action and Search Report, dated Aug. 29, 2018, in related Chinese Application No. 201510639477.9, including an English translation of the Chinese Office Action. (All references not cited herewith have been previously made of record.).

Office Action received in corresponding EP Application No. 15 188 475.6, dated Jan. 2, 2018.

European Search Report in corresponding European Application No. 15188475.6 dated May 9, 2016.

Office Action received in corresponding European Application No. 15188475.6-1559, dated May 26, 2017.

European Office Action for related European Application No. 15188475.6 dated Jan. 27, 2020. (All of the references cited in the European Office Action are already of record.).

Brazilian Office Action and Search Report for related Brazilian Application No. BR102015025466-0, dated Apr. 16, 2020, including a partial English translation of the Office Action. (All of the references cited in the Brazilian Office Action and Search Report were previously cited in the Information Disclosure Statement filed on Nov. 3, 2017.).

* cited by examiner

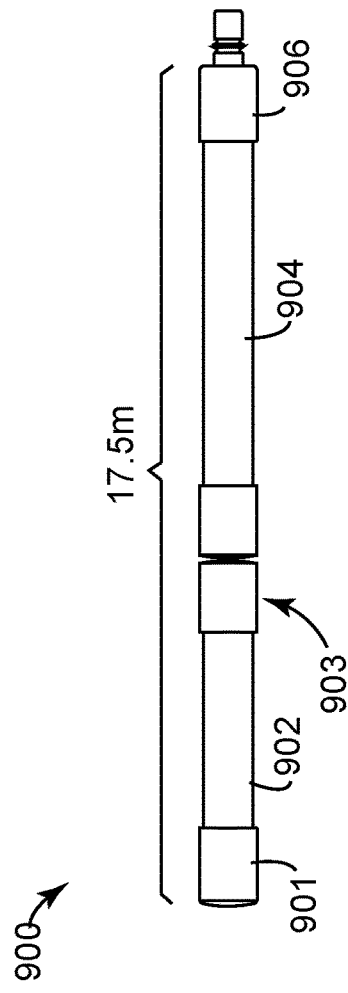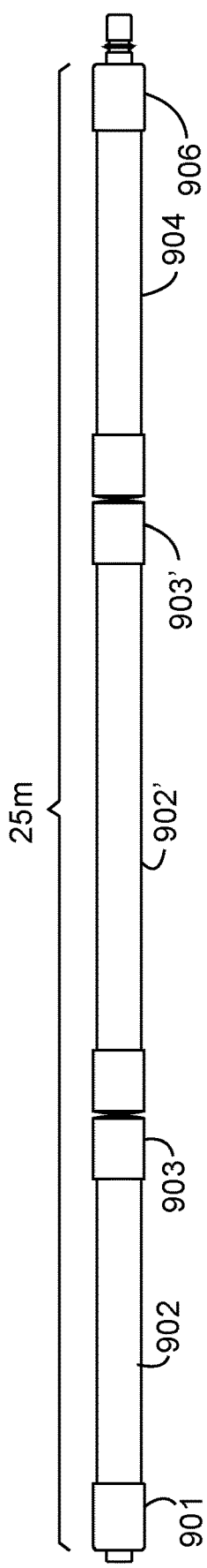
FIG. 9A
FIG. 9B

APPARATUS AND METHOD FOR VIBRATION MITIGATION WITH DYNAMIC VIBRATION ABSORBER

BACKGROUND

Technical Field

Embodiments of the subject matter disclosed herein generally relate to an apparatus and method for vibration mitigation by using a dynamic vibration absorber (DVA) device.

Discussion of the Background

An electro-mechanical cable may be a cable, such as, for example, a marine-seismic cable, including sensor components, data-transmission cables, power-transmission cables and strength enhancing and buoyancy enhancing components arranged in a single cable. A marine-seismic cable may be an electro-mechanical cable used for gathering data on the nature and composition of the earth below a body of water using seismic imaging techniques. The marine-seismic cable, or seismic streamer, may be designed to reduce hydrodynamic induced flow noise. For example, the marine seismic cable may be cylindrical.

FIG. 1 depicts an exemplary marine-seismic cable system in use. A marine vessel 101, including a lead-in towing assembly 102, may deploy and tow electro-mechanical cables 103, on or below the surface of the water. The electro-mechanical cables 103 may be of any suitable length, and may be made up of shorter connected sections 106 of electro-mechanical cabling which may also be of any suitable length. For example, an electro-mechanical cable 103 may be kilometers in length, with each section 106 being, for example, 75 meters to 200 meters in length. Sections 106 may be detachable from each other. The electro-mechanical cable 103 may be, for example, a marine-seismic cable or seismic streamer. Seismic-imaging systems may make use of more than one electro-mechanical cable 103. The electro-mechanical cables 103 may be deployed as a single section 106, a linear series of sections 106, or as a horizontal offset series of sections 106 (i.e., streamer spread), producing a sensor field.

Sections 106 of the electro-mechanical cables 103 may include various sensor components 104. Sensor components 104 may be, for example, hydrophones, geophones, accelerometers, electro-magnetic sensors, optical sensors, gravity sensors, or a combination thereof and may be distributed at regular intervals along the electro-mechanical cables 103. An outer jacket around the electro-mechanical cable 103 may be, for example, a polyurethane jacket, and may be smooth in order minimize noise in the sensor components 104. A buoyant material may be contained in the electro-mechanical cable 103, and may help keep the electro-mechanical cable 103 level on top of or under the water.

A seismic source 108 may be used to produce a shockwave (also called seismic wave), using any suitable manner of generating acoustic energy. The seismic source may include one or more air guns or vibratory elements. When conducting an acoustic survey, the shockwave may be reflected by the geologic features of the sea floor and picked up by the sensor components 104. Vibrations emanating from the head of the streamer field (or streamer spread) 110, which are produced by the vessel 101 and/or lead-in towing assembly 102, may contaminate the seismic signals measured by the sensor components 104. Radial vibration isolation modules 109 may be placed between the towing assembly 102 and the electro-mechanical cables 103, at the head of the streamer field 110, in order to mitigate the transmission of vibration noise. There are several types of radial vibration isolation modules 109 that may be used in electro-mechanical cables 103 at the head of the streamer field 110. Each of the available types of radial vibration isolation modules 109 may include a single stretch section with vibration attenuation that occurs due to a complex spring rate of the radial vibration isolation module 109. Radial vibration isolation modules 109 may be tailored to attenuate vibration over the frequency bandwidth of 2 to 250 Hz, which may be common in seismic acquisition.

The electro-mechanical cables 103 may each include one or more positioning devices, also known as birds 107. Birds 107 may include control surfaces that may be used to position the electro-mechanical cables 103. For example, the birds 107 may be used to maintain the electro-mechanical cables 103, to which they are attached, in a known and controllable position relative to other electro-mechanical cables 103 or relative to the water surface. The birds 107 are capable of moving the electro-mechanical cables 103. The electro-mechanical cables may also include attached recovery nodes, which may be devices clamped to the outsides of the electro-mechanical cables 103 that may include sensors (pressure sensors) that monitor for when the electro-mechanical cables 103 pass a given depth. The recovery nodes may include an inflatable portion that may inflate if an electro-mechanical cable 103 has sunk too far into the water, causing the electro-mechanical cable 103 to float back to the surface where it can be retrieved.

Because the electro-mechanical cables 103 are deployed in a viscous fluid, for example, water, the electro-mechanical cables 103 are subject to energy sources from both man-made sources, such as energy transmitted through the tow assembly 102, or energy from the propulsion system of the marine vessel 101, and natural sources, such as wave motion and weather. The energy from these sources may diminish the quality of the seismic data recorded by the sensor components 104, as they may interfere with the signal from the acoustic energy reflected off the sea floor. Thus, the signal measured by the sensor components 104 of an electro-mechanical cable 103 may be divided into two parts, the "signal" pertaining to the geophysical structure of the sea floor, and "noise," which may be picked up from other man-made or natural sources. The signal is desired while the noise contaminates the signal.

Existing noise suppression hardware, such as the radial vibration isolation modules 109, which are concentrated at the head of the streamer field 110, between the towing assembly 102 and the electro-mechanical cables 103, may not provide a sufficient level of noise abatement because devices that operate over such a wide frequency bandwidth, e.g., 2-250 Hz, are typically a result of compromise, sacrificing performance in one frequency region to handle another. The "noise" experienced by electro-mechanical cables 103 may be both spatially dependent, varying depending on the position within the streamer field 110, and frequency dependent. Thus, there is a need for an apparatus and method for vibration mitigation that overcomes the problems mentioned above.

SUMMARY

In one embodiment, a vibration mitigation assembly includes first and second elastic sections, each having a spring rate and adapted to attenuate vibrations in a specified frequency range; an inter-module connector configured to connect with a first end to the first elastic section and with a second end to the second elastic section; a head-end coupler adapted to couple the first elastic section to a component of an electro-mechanical cable or a tow assembly and the second elastic section to another component of the electro-mechanical cable or tow assembly; and a dynamic vibration absorber device located inside the inter-module connector. The dynamic vibration absorber device changes a resonant frequency of the vibration mitigation assembly to two smaller vibration peaks.

According to another embodiment, there is a dynamic vibration absorber device for reducing a resonant frequency of a node to which the dynamic vibration absorber device is attached to. The dynamic vibration absorber device includes a housing configured to be attached to the node; an absorber mass located inside the housing; and first and second diaphragms attached to the housing and configured to suspend the absorber mass inside the housing. The dynamic vibration absorber device changes a resonant frequency of the node to two smaller vibration peaks.

According to still another embodiment, there is a streamer for conducting a seismic survey, the streamer including plural sections each comprising at least one sensor component for collecting seismic data; and a dynamic vibration absorber device for reducing a resonant frequency of a node to which the dynamic vibration absorber device is attached to. The node is part of the streamer.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 9A and 9B illustrate vibration mitigation assemblies having a dynamic vibration absorber device;

DETAILED DESCRIPTION

Figure 1:
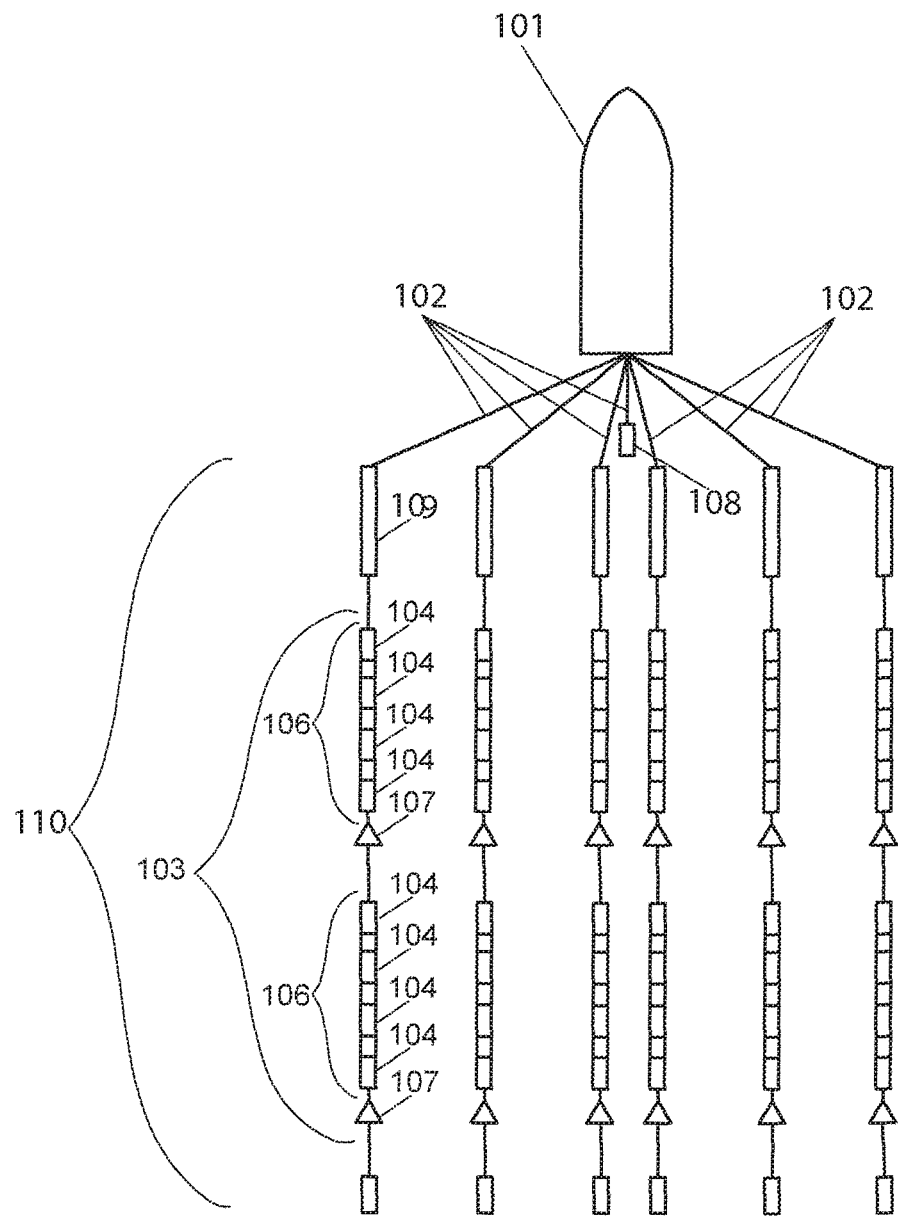
FIG. 1 depicts an exemplary marine-seismic cable system in use.

The following description of the exemplary embodiments refers to the accompanying drawings. The same reference numbers in different drawings identify the same or similar elements. The following detailed description does not limit the invention. Instead, the scope of the invention is defined by the appended claims. In various embodiments as illustrated in the figures, a vibration mitigation assembly is included in an electro-mechanical cable for vibration mitigation.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

As discussed above, existing noise suppression hardware, such as the radial vibration isolation modules 109, are concentrated at the head of the streamer field 110, between the towing assembly 102 and the electro-mechanical cables 103. This placement may be based on an assumption that the primary source of cable borne vibration precedes the head of the streamer field 110, and that transverse and axial motion within the electro-mechanical cables 103 derives from axial motion of the electro-mechanical cables 103. However, it was observed that noise generated in front of the head of the streamer field 110 may decay rapidly, and noise picked up by the sensor components 104 of the electro-mechanical cables 103 may originate with the birds 107, as well as with the recovery nodes or other existing equipment (called herein nodes for simplicity) that are attached to the electro-mechanical cables 103. It has also been observed that the birds 107, the recovery nodes or other nodes may introduce noise along all axes of movement of the electro-mechanical cables 103, including the x, y, z, and rotational axes. Furthermore, it was observed that the frequency range of the noise at a frontal location of the electro-mechanical cable may be different than at a distal location. Thus, a new device is necessary for removing the noise at any location along the cable and also the structure and position of the new or existing devices needs to be adapted to the characteristics of the cable and the frequency range of the noise at that location along the cable.

Figure 2:
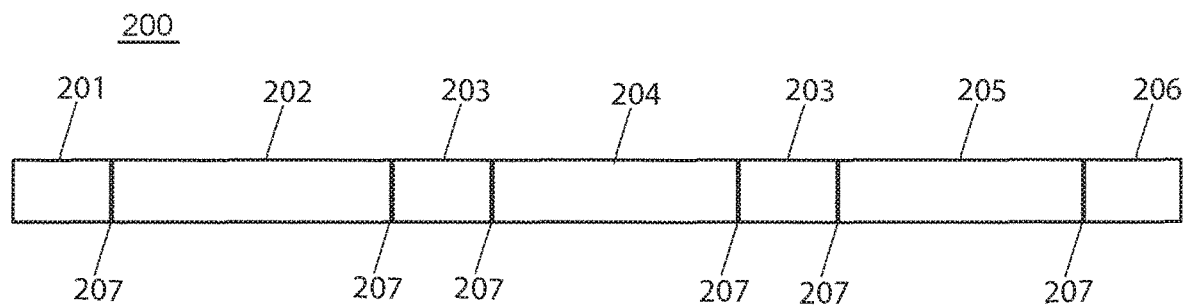
FIG. 2 depicts an exemplary vibration mitigation assembly.

In this regard, FIG. 2 depicts a vibration mitigation assembly 200. Vibration mitigation assembly 200 may include head end coupler 201 and tail end coupler 206, and any suitable number of tuned elastic sections, such as, for example, tuned elastic sections 202, 204, and 205, connected using any suitable number of inter-module connectors 203. The head end coupler 201 and the tail end coupler 206 may allow the vibration mitigation assembly 200 to be coupled to any of the components of an electro-mechanical cable 103, such as the sections 106 with sensor components 104 and the birds 107. For example, the vibration mitigation assembly 200 may be coupled to the tow assembly 102 and to one of the sections 106 along the length of one of the electro-mechanical cables 103 using the head end coupler 201 and the tail end coupler 206. The vibration mitigation assembly 200 may be coupled at any suitable location along the electro-mechanical cable 103. In one application, the vibration mitigation assembly 200 may be coupled between two different sections 106. In another application, the vibration mitigation assembly 200 may be at the end of the electro-mechanical cable 103, and only the head end coupler 201 may be coupled to a preceding section 106. In yet another application, vibration mitigation assembly 200 may be integrally build inside a section 106. In other words, vibration mitigation assembly 200 may exist as an independent module that is configured to be attached anywhere along the length of the electro-mechanical cable 103 or it may be manufactured inside any section 106 of electro-mechanical cable 103. Those skilled in the art would recognize the greater flexibility if the former approach is taken. However, the later approach is not without merits.

The tuned elastic sections 202, 204, and 205 may be made of any suitable material, and in any suitable shape, and may be elastic stretch modules with a complex spring rate selected for a given frequency pass-band. A complex spring rate is a vector sum of a dynamic spring rate and dynamic loss rate. The tuned elastic sections 202, 204, and 205 may each have a complex spring rate due to the use of a spring, damper, visco-elastic material, or other suitable device, material, or combination thereof. Each of the tuned elastic sections in the vibration mitigation assembly, such as the tuned elastic sections 202, 204, and 205 may have different complex spring rates, and may use different combinations of springs, dampers, and visco-elastic materials, or other devices and materials, and may be of different lengths. A specific example of a tuned elastic section is discussed later.

Each of the tuned elastic sections 202, 204, and 205 may be optimized for a predefined frequency bandwidth, which may allow for the tuned elastic section to suppress vibrations within that frequency bandwidth. For example, if the seismic frequency range of interest is 5 to 250 Hz, such a tuned elastic section may be configured to suppress noise only in a reduced frequency range, for example, 5 to 30 Hz. Other frequency ranges may be uses as will be appreciated by those skilled in the art. This may reduce the amount of noise that reaches the sensor components 104. The frequency bandwidth of vibrations suppressed by one of the tuned elastic sections 202, 204, and 205 may be selected based on the intended location of the vibration mitigation assembly 200 along the electro-mechanical cable 103 and within the streamer field 110, and on the number of frequency bandwidths selected for other tuned elastic sections used in the same vibration mitigation assembly 200. For example, if low frequency noise is determined to be generated at the front of the streamer field 110 and high frequency noise is detected to be generated at the rear of the streamer field 110, one or more elastic sections 202, 204, and 205 tuned for low frequency may be frontally deployed while one more elastic sections 202, 204, and 205 tuned for high frequency may be deployed at the end of the streamer field. The frontal and rear positions are exemplary and those skilled in the art would understand that the elastic sections 202, 204, and 205 may be deployed at any location along the electro-mechanical cable, as determined by the operator of the seismic survey. The structure of one of the tuned elastic sections 202, 204, and 205, including length and use of any springs, dampers, visco-elastic, or other materials or devices, may be based on the frequency bandwidth of the vibrations the tuned elastic section is intended to suppress. Note that in one application a single tuned elastic section may be used for an entire section and/or for an entire electro-mechanical cable. More tuned elastic sections may be more advantageous for suppressing a larger frequency range noise.

The tuned elastic sections 202, 204, and 205 of the vibration mitigation assembly 200 may be connected together using the inter-module connectors 203. The boundaries between the tuned elastic sections 202, 204, and 205, and the inter-module connectors 203, the head end coupler 201, and the tail end coupler 206, may be high impedance material interfaces 207. The high impedance material interfaces 207 may use any suitable combination of physical properties, such as density and elasticity, and coupling geometry to create a high impedance mismatch which may inhibit the transmission of energy between the various couplings of the vibration mitigation assembly 200. For example, if the tuned elastic section 202 is made out of rubber and the inter-module connector 203 is made out of titanium, the interface 207 is considered to be a high impedance material interface. This is so because the impedance of a material depends on its density and a ratio of the densities of titanium and rubber is 2 or larger. Thus, a high impedance material interface is considered herein to be an interface between two different elements having the density ratio 2 or larger.

The sequential use of the high impedance material interfaces 207 and tuned elastic sections 202, 204, and 205 may result in the vibration mitigation assembly 200 acting as a cascade filter. For example, a first tuned elastic section 202 may be configured to attenuate noise in the frequency range of 5 to 10 Hz, a second tuned elastic section 204 may be configured to attenuate noise in the frequency range of 10 to 15 Hz and a third tuned elastic section 205 may be configured to attenuate noise in the frequency range of 15 to 25 Hz. These ranges are exemplary and not intended to limit the invention. More ranges may be envisioned if more tuned elastic sections are used. The ranges noted above may be narrower or larger or they may overlap. Note that the tuned elastic sections may be distributed one after another at substantially a same location of the electro-mechanical cable or they may be physically separated by one or more streamer sections 106. In one application, the one or more tuned elastic sections may be connected to each other. In still another application, two or more of the tuned elastic sections are isolated by one or more high impedance material interfaces 207 from each other.

The vibration mitigation assembly 200 may thus be tailored to attenuate vibration based on frequency and spatial requirements through the selection of tuned elastic sections, for example, tuned elastic sections 202, 204, and 205, used in the vibration mitigation assembly 200. The vibration mitigation assembly 200 may use sequential impedance optimization, through the impedance of the tuned elastic sections 202, 204, and 205, to attenuate vibrations experienced at a specific section of the electro-mechanical cable 103, at a specific location with the streamer field 110.

Figure 3:
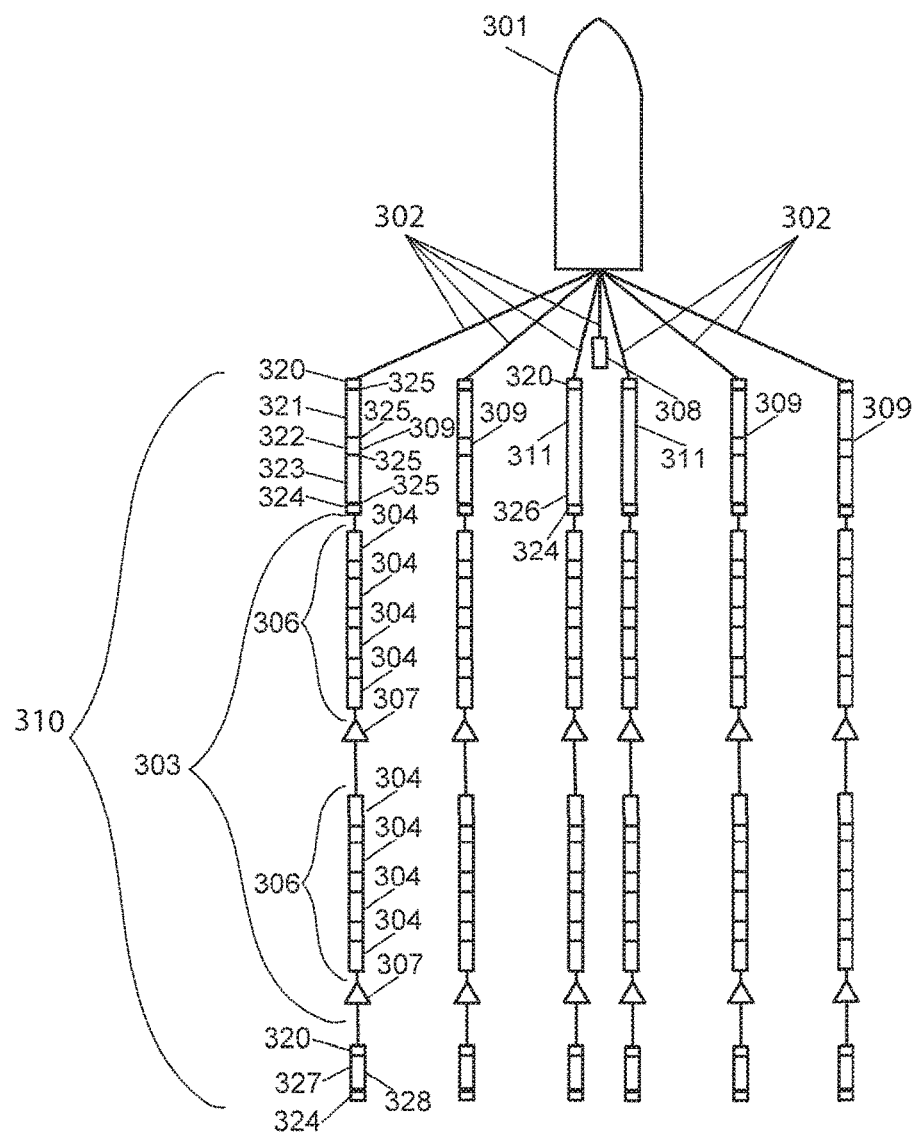
FIG. 3 depicts an exemplary marine-seismic cable system with vibration mitigation assemblies.

FIG. 3 depicts an exemplary marine-seismic cable system with vibration mitigation assemblies. Any number of vibration mitigation assemblies, such as the vibration mitigation assembly 200, may be installed on the electro-mechanical cables 303 of the streamer field 310. For example, vibration mitigation assemblies 309 and 311 may be installed at the head of each electro-mechanical cable 303 in the streamer field 310 in place of the radial vibration isolation modules 109. Additional vibration mitigation assemblies 327 may be installed at the tail of each electro-mechanical cable 303, and further vibration mitigation assemblies may be installed at any suitable location along the electro-mechanical cables 303. In one embodiment, one or more vibration mitigation assembly is installed after each bird. The vibration mitigation assemblies discussed herein may include any number of tuned elastic assemblies. Thus, a single vibration mitigation assembly may be designed to attenuate noise in a narrow frequency range or large frequency range. Therefore, a vibration mitigation assembly may be tuned to attenuate a desired frequency range, as desired by the seismic survey's operator. According to an embodiment, such an assembly is advantageous because it may be tuned depending upon its location along the electro-mechanical cable, the type of sensors carried by the cable, the type of birds used to steer the cable, etc. Thus, the assembly solution disclosed in this embodiment is highly adaptive and flexible depending on the seismic survey.

The vibration mitigation assemblies 309, 311, and 327 may all differ from each other, as each of the vibration mitigation assemblies may be assembled to attenuate the vibrations experienced at its location of installation. For example, the vibration mitigation assembly 309 may be assembled using head end coupler 320, tail end coupler 324, tuned elastic sections 321 and 323, and inter-module connector 322, joined at high impedance material interfaces 325. The tuned elastic sections 321 and 323 may differ, for example, having different lengths or being constructed using different springs, dampers, or visco-elastic materials. The vibration mitigation assembly 311 may be assembled using a head end coupler 320, tailed end coupler 324, and a tuned elastic section 326. The tuned elastic section 326 may differ from the tuned elastic sections 321 and 323, as the tuned elastic section 326 may be constructed to suppress vibrations at frequencies experienced by the electro-mechanical cable 303 closest to the air gun 308. The frequency of those vibrations may be different than the frequency of vibrations experienced by the electro-mechanical cable 303 farther from the air gun 308, resulting in the structure of the vibration mitigation assembly 309 differing from the structure of the vibration mitigation assembly 311. The vibration mitigation assembly 327 may use a tuned elastic section 328, which may differ from, for example, be shorter than, the vibration mitigation assemblies 309 and 311.

Figure 4:
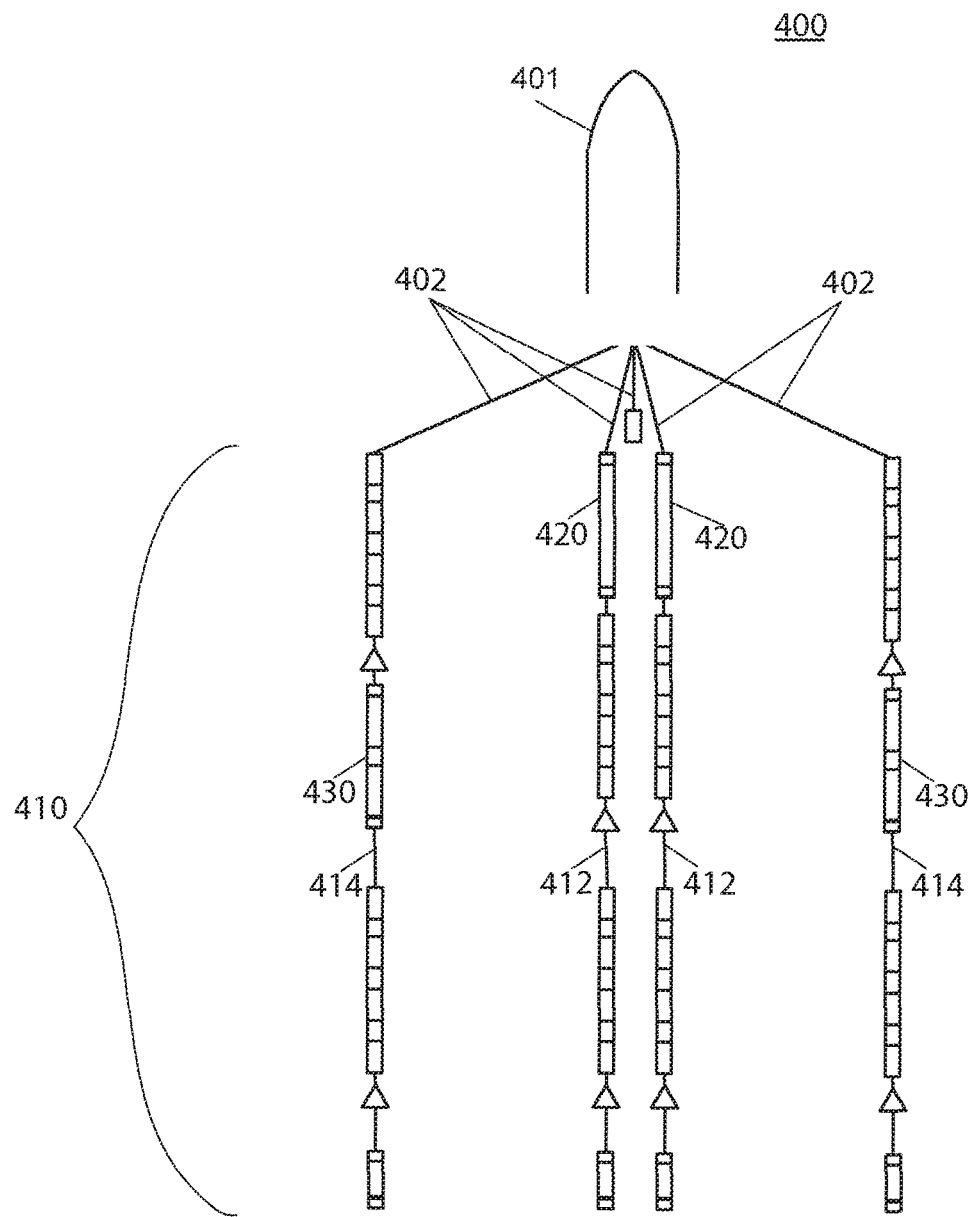
FIG. 4 depicts an exemplary streamer spread that uses vibration mitigation assemblies.

In addition, the vibration mitigation assemblies may be disposed along each electro-mechanical cables in different configurations. More specifically and as illustrated in FIG. 4, a seismic survey system 400 includes a vessel 401 towing a streamer spread 410 that includes central electro-mechanical cables 412 and peripheral electro-mechanical cables 414. One or more central electro-mechanical cables may be fitted with one type of vibration mitigation assemblies 420 while the peripheral electro-mechanical cables 414 may be fitted with another type of vibration mitigation assemblies 430. The term "type of vibration mitigation assembly" may refer to various seismic parameters, for example, the frequency range attenuation. In another embodiment, the first type of vibration mitigation assemblies 420 are distributed at a front part of the seismic spread 410 while the second type of vibration mitigation assembly is distributed after each bird. In still another application, the first type of vibration mitigation assemblies are distributed at the front part of the seismic spread, only on the central cables 412 while the second type of vibration mitigation assembly is distributed after each bird only on the peripheral cables 414. Other combination of the first and second type of vibration mitigation assemblies, other positions of them and other types of assemblies may be conceived on all or part of the cable of the streamer spread 410.

Vibration mitigation assemblies, such as the vibration mitigation assemblies 309, 311, and 327, may be constructed using any suitable combination of tuned elastic sections, such as the tuned elastic sections 321, 323, and 326, joined by inter-module connectors and high-impedance material interfaces. Each vibration mitigation assembly used with electro-mechanical cables in a streamer field, such as the electro-mechanical cables 303 in the streamer field 310, may be constructed based on the frequency of vibrations that the vibration mitigation assembly is intended to suppress. The frequency of the vibrations may be dependent on the intended installation location for the vibration mitigation assembly along the electro-mechanical cable and within the streamer field.

Figure 5:
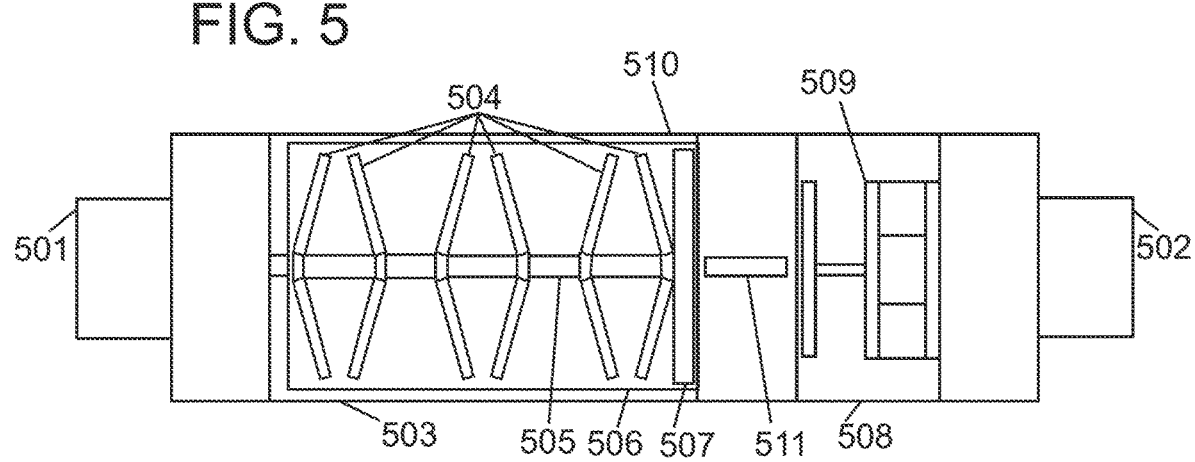
FIG. 5 depicts an exemplary cable dynamics isolator.

An example of a tuned elastic section 500 is now discussed with regard to FIG. 5. FIG. 5 shows a tuned elastic element 500 that includes include male and female couplings 501 and 502, and a housing 510 that may contain an axial motion suppression section 503 and/or a bending and rotational motion suppression section 508. The male and female couplings 501 and 502 may allow the tuned elastic element 500 to be coupled to any of the components of an electro-mechanical cable 503, such as the sections 506 with sensor components 504 and birds 107. For example, the tuned elastic element 500 may be coupled to one of the birds 107 and to one of the sections 106 along the length of one of the electro-mechanical cables 103 using the male and female couplings 501 and 502. Alternatively, the tuned elastic element 500 may be coupled between two consecutive sections 106. In one application, the tuned elastic element 500 may be coupled between a section 106 and the towing assembly 102 as illustrated in FIG. 1. In still another application, two or more tuned elastic element 500 are connected to each other before being connected to the sections. In yet another application, the tuned elastic element 500 may be built into one or more sections 106 of the streamer, or into a radial vibration isolation module 109.

Housing 510 may be any suitable housing, of any suitable material and any suitable shape for marine use. For example, housing 510 may be a cylindrical polyurethane jacket. Housing 510 may cover the axial motion suppression section 503 and the bending and rotational motion suppression section 508. Housing 510 may be flexible and stretchable, allowing for some motion of the components of the tuned elastic element 500.

The axial motion suppression section 503 may include any suitable equipment for the suppression of axial motion in the tuned elastic element 500. For example, the axial motion suppression section 503 may include disk springs 504, arranged along a rod 505, having a plunger 507, inside of a chamber 506. Note that the number of the disk springs 504 may be varied to tune the axial motion suppression section accordingly. Rod 505 may be attached, or mechanically linked, to the male coupling 501 or the female coupling 502, for example, by being welded or bolted to the male coupling 501 or the female coupling 502, such that motion of the male coupling 501 or the female coupling 502 may be transmitted to 505. Chamber 506 may be attached, or mechanically linked, to male coupling 501 or female coupling 502, whichever is not attached to rod 505, such that motion of male coupling 501 or female coupling 502 may be transmitted to chamber 506. Rod 505 and chamber 506 may be directly attached to male coupling 501 and female coupling 502, or may be indirectly linked to male coupling 501 and female coupling 502, for example, by being attached to a part of tuned elastic element 500 that is in turn attached to male coupling 501 and female coupling. Rod 505 may be inserted into chamber 506, with the shaft of the rod 505 going through an appropriately sized opening in the base of chamber 506. Rod 505 and chamber 506 may be made from any suitable material, and may be in any suitable shape for use within housing 510 of tuned elastic element 500. For example, rod 505 and chamber 206 may be cylindrical Disk springs 504 may be of any suitable size and made of any suitable material, including metals and composites, and may have a deflection curve that is non-linear and digressive. Any number of disk springs 504 may be arranged along the rod 505 in any suitable manner, for example, in a parallel, in series, or any combination thereof. For example, the number and arrangement of disk springs 504 used in the tuned elastic element 500 may depend on the nature, length, diameter, etc. of the electro-mechanical cable 103 to which the tuned elastic element 500 may be attached, and the location of attachment. In other words, the tuned elastic element 500 has a "tuning" capability that may be exploited by the seismic survey's operator to achieve the best damping/attenuation of the noise propagating along the streamer.

The axial motion suppression section 503 may also use dampers to inhibit free vibration along longitudinal axis. The flow path between Belleville sets may be controlled and filled with the appropriate fluid. Select friction materials may be included at sliding points to implement coulomb damping.

The bending and rotational motion suppression section 508 may include any suitable equipment for the suppression of rotational motion and bending in the tuned elastic element 500. For example, the bending and rotational motion suppression section 508 may include a multi-axis flexure 509. The multi-axis flexure 509 may be a 3-axis flexure with low bending stiffness in one direction, a higher bending stiffness in the other two directions, and may support large axial tensile loads. Two or more flexure sets, oriented at a minimum of 90 degrees to each other, may be used in the multi-axis flexure 509. This may allow the multi-axis flexure to suppress bending, or transverse motion, regardless of orientation of the tuned elastic element 500. The multi-axis flexure 509 may also attenuate rotational motion. The multi-axis flexure 509 may be made of any suitable material. The action of the multi-axis flexure 509 may suppress transmission of bending and rotational motion through the cable dynamic isolator 500, for example, attenuating vibrations from bending and rotational motion transmitted from one of the birds 107, reducing the noise experienced by the sensor components 104. The bending and rotational motion suppression section 508 may also use friction pads for coulomb damping and fluid filled bladders or pockets may provide viscous damping.

Tuned elastic element 500 may also include sensors 511. The sensors 511 may be any suitable sensors or instrumentation for monitoring the performance of the tuned elastic element 500. For example, the tuned elastic element 500 may include, within the housing 510, any combination of sensors 511 that may be, for example, accelerometers to measure acceleration, force sensors for the measurement of force, and strain gages for the measurement of strain within the tuned elastic element 500.

Figure 6:
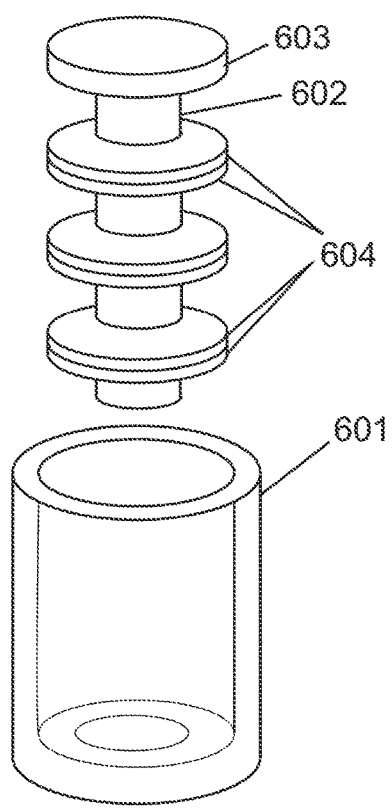
FIG. 6 depicts an exemplary portion of a cable dynamics isolator including a chamber, a rod, and disk springs.

FIG. 6 depicts an exemplary portion of a tuned elastic element including a chamber, a rod, and disk springs. The portion of the tuned elastic element 600 used in the axial motion suppression section 503 may include chamber 601, rod 602 with plunger 603, and disk springs 604. The disk springs 604 may be arranged in any suitable manner along the rod 602. For example, several pairs of the disk springs 604 may be arranged along the rod 602, with each pair including two disk springs 604 in series touching at their base. The rod 602 may be inserted into the camber 601, such that the disk springs 604 may be compressed between the bottom of the chamber 601 and the plunger 603 based on motion of either the chamber 601 or the rod 602.

Figure 7:
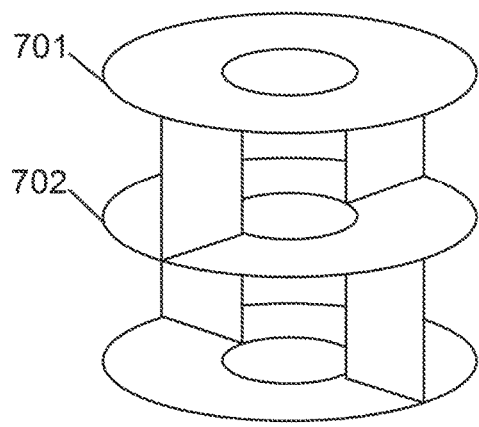
FIG. 7 depicts an exemplary multi-axis flexure.

FIG. 7 depicts an exemplary multi-axis flexure. Note that a single axis flexure may be used. A multi-axis flexure 700 may be, for example, a beam-type flexure, and may include flexure sets 701 and 702. The flexure sets 701 and 702 may be oriented at a minimum of a 90 degree angle with respect to each other, and may in combination absorb rotational motion and bending. The multi-axis flexure 700 may include any number of flexure sets oriented similarly to the flexure sets 701 and 702.

Figure 8:
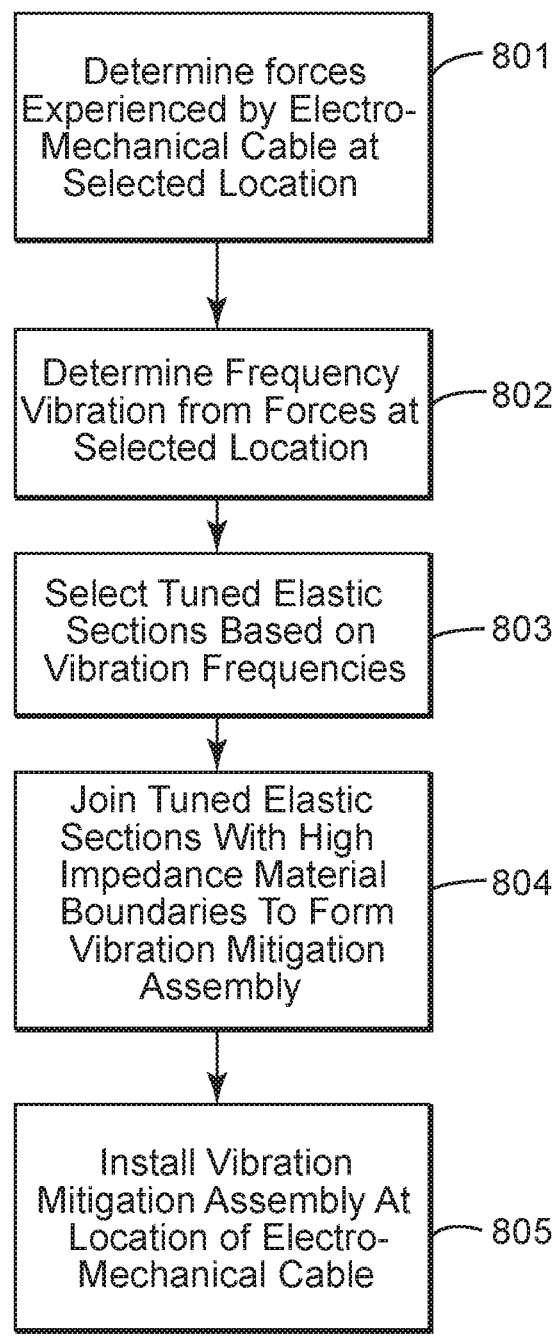
FIG. 8 depicts an exemplary procedure for preparing a vibration mitigation assembly with sequential impedance optimization.

FIG. 8 depicts an exemplary procedure for preparing a vibration mitigation assembly with sequential impedance optimization. In block 801, forces experienced by an electro-mechanical cable may be determined at selected locations. For example, the electro-mechanical cable 103 may be tested at sea, while being towed behind the marine vessel 101. Vector sensors, such as accelerometers, may be used in the electro-mechanical cable 103 to determine the properties of axial, rotational, transverse, and bending forces experienced at selected locations along the electro-mechanical cable 103, in a selected part of the streamer field 110. The forces may also be determined in an any other suitable manner, including simulations, estimations, or application of engineering and physics principles to the known properties of the electro-mechanical cable 103, marine vessel 101, towing assembly 102, and the water.

In block 802, vibration frequencies may be determined (measured or calculated) from the forces determined in block 801. For example, the frequencies of the vibrations experienced by the electro-mechanical cable 103 at the selected locations may be determined based on the forces experienced the electro-mechanical cable 103 at the selected locations. The vibrations may be the noise experienced by the electro-mechanical cable 103 during use which may interfere with the signal being picked up by the sensor components 104 during a seismic survey. The vibration mitigation assemblies intended for installation at the selected locations may need to suppress or attenuate the vibrations at the determined frequencies experienced by the electro-mechanical cable 103.

In block 803, tuned elastic sections may be selected based on the determined vibration frequencies in block 802. For example, the tuned elastic sections, such as the tuned elastic sections 202, 204, and 205, may be selected and arranged based on the frequency of vibrations to be suppressed by the vibration mitigation assembly, for example, the vibration mitigation assembly 200, in order to attenuate vibrations experienced by the electro-mechanical cable 103. Any number of the tuned elastic sections may be selected for a given vibration mitigation assembly, and they may have varying lengths and constructions, including use of differing combinations of springs, dampers, and visco-elastic material. Note that the tuned elastic elements discussed above with regard to FIGS. 4-7 are only exemplary and other tuned elastic elements may be used. In one application, traditional vibration attenuation modules, which are not tunable, may be mixed up with one or more tuned elastic elements to produce a vibration mitigation assembly. The tuned elastic sections may be selected to create a cascade filter for the determined vibration frequencies.

In block 804, the tuned elastic sections and/or non-tuned elements (e.g., traditional vibration attenuation modules) may be joined with high impedance material boundaries to form a vibration mitigation assembly. For example, the tuned elastic sections 202, 204, and 205, may be joined together using inter-module connectors 203 between each of the tuned elastic sections 202, 204, and 205 to form the vibration mitigation assembly 200. The coupling between each of the tuned elastic sections 202, 204, and 205, and the inter-module connectors 203 may be a high impedance material interface 207. A head end coupler 201 and a tail end coupler 206 may also be joined to the vibration mitigation assembly 200, for example, at the front and back of the vibration mitigation assembly, using high impedance material interface 207. The tuned elastic sections may be arranged in the vibration mitigation assembly according to sequential impedance optimization to create a cascade filter that may allow the vibration mitigation assembly to attenuate vibrations at the determined frequencies at the intended installation location along an electro-mechanical cable, such as the electro-mechanical cable 103, and within a streamer field, such as the streamer field 110.

Thus, according to an embodiment, a vibration mitigation assembly may be adjusted to have more tuned elastic sections joined by more or less inter-module connectors depending on the type of streamer, the forces exerted on the streamer, and the location of the vibration mitigation assembly along the streamer. In other words, a vibration mitigation assembly may be dynamically configured for a future job in a streamer. This provides great flexibility in fitting any existing streamer with the appropriate noise suppression device, at any desired location along the streamer.

At block 805, a vibration mitigation assembly may be installed in an electro-mechanical cable. For example, the vibration mitigation assembly 309 may be installed at the head of the electro-mechanical cable 303 farthest from the air gun 308. The vibration mitigation assembly may be installed at the selected location in the electro-mechanical cable 103 and the streamer field 110 at which the forces were measured, as the vibration mitigation assembly may be constructed specifically to attenuate vibrations caused by the forces measured at that selected location. Note that more than one vibration mitigation assembly may be installed along a single cable. In one embodiment, a mixture of vibration mitigation assemblies is installed along a single cable. In another embodiment, the mixture of vibration mitigation assemblies is installed along the streamer field, with some or all cables having different assembly configurations. The type and position of the vibration mitigation assembly used for each cable is predetermined based on the above noted calculations, which take into account the type of seismic survey and its characteristics.

The vibration mitigation assemblies 309 and 311 illustrated in FIG. 3 and discussed in more detail with regard to FIGS. 4-7 may have a different structure as now discussed. FIG. 9A illustrates a vibration mitigation assembly 900 that includes a head-end coupler 901, a first elastic section 902, an inter-module connector 903, a second elastic section 904 and a tail-end coupler 906, all coupled in this order. The head-end coupler 901 can be connected to a lead-in cable, a section of the streamer, a head buoy, a bird, or any other node or element of the streamer. The tail-end coupler can be connected to a section of the streamer, a tail buoy, a bird, or any other node or element of the streamer.

The first and second elastic sections 902 and 904 may have the same or different lengths. In one embodiment, the first and second elastic sections are made of rubber while the inter-module connector 903 may be made of a metal, e.g., titanium. More than one inter-module connector 903 may be used in a single vibration mitigation assembly, as illustrated in FIG. 9B. FIG. 9B shows two inter-module connectors 903 and 903' and three elastic sections 902, 902', and 904. The elastic sections may have similar or different properties and/or lengths. An exemplary length for the vibration mitigation assembly of FIG. 9A is about 17.5 m while an exemplary length for the assembly of FIG. 9B being about 25 m. Other lengths may be used.

Figures 10A, 10B:
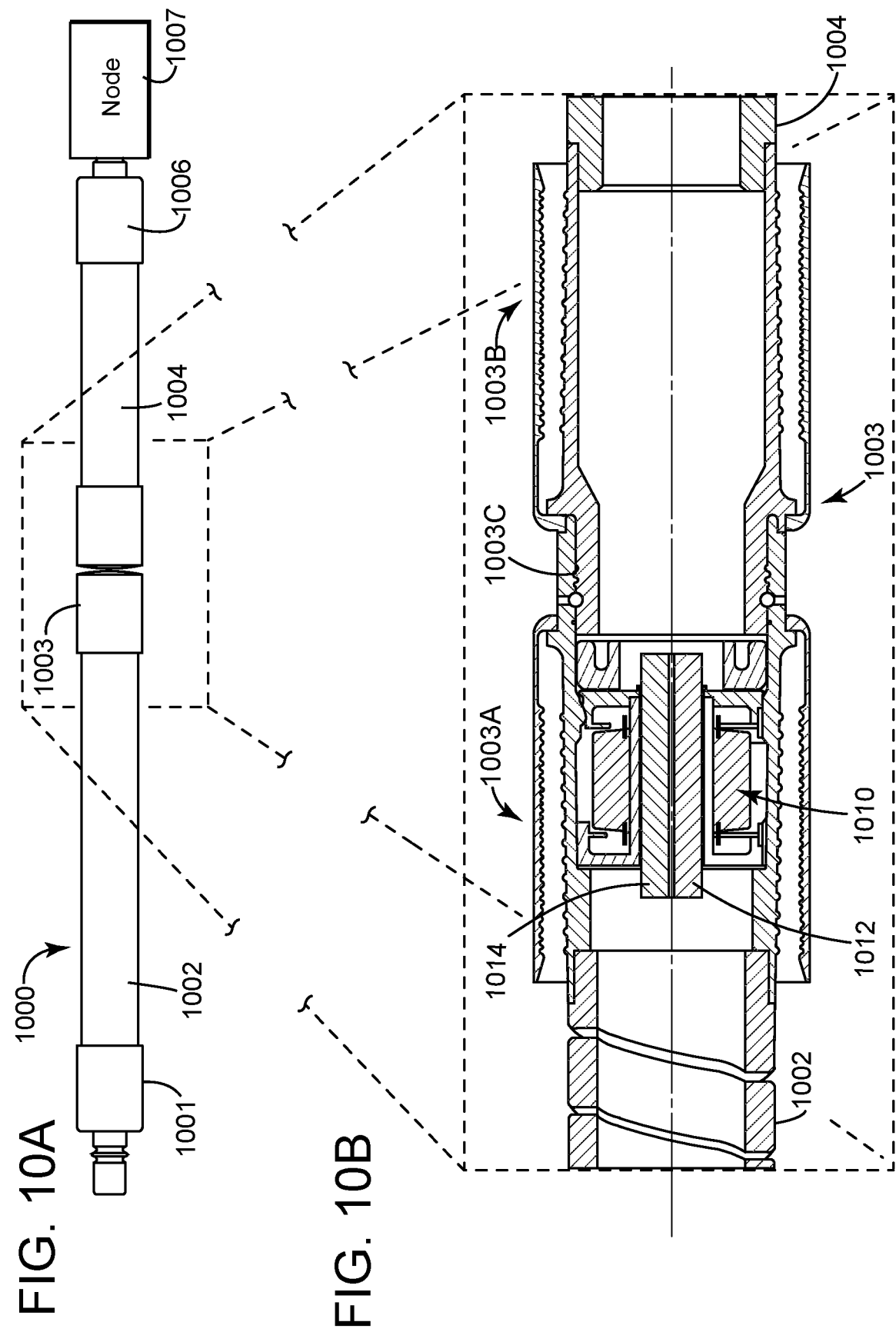
FIG. 10A illustrates a vibration mitigation assembly having a dynamic vibration absorber device inside an inter-module connector.
FIG. 10B illustrates a structure of the dynamic vibration absorber.

According to an embodiment, the vibration mitigation assembly 1000 shown in FIG. 10A, has the head-end coupler 1001, tail-end coupler 1006, first elastic section 1002, second elastic section 1004, and inter-module connector 1003. The tail-end coupler 1006 is attached to a node 1007, which can be a section of the streamer, a bird or another element of the streamer spread. The inter-module connector 1003 in the previous embodiments had only the role of coupling the first elastic section to the second elastic section and also for providing a material with a larger density so that a first high impedance interface is formed between the first elastic section 1002 and the inter-module connector 1003 and a second high impedance interface is formed between the second elastic section 1004 and the inter-module connector 1003.

The embodiment illustrated in FIG. 10B has a dynamic vibration absorber (DVA) device 1010 formed inside the inter-module connector 1003. Note that the inter-module connector 1003 may have two parts 1003A and 1003B connected to each other by a connection 1003C, such that the housing of one part slides inside the housing of the other part. FIG. 10B also shows the first elastic section 1002 being a nylon reinforced rubber house while the inter-module connector is made of a metal. The DVA device 1010 is shown in FIG. 10B as being formed inside the leading part 1003A of the inter-module connector 1003, i.e., the part closest to the vessel. FIG. 10B also shows a strain cable 1012 and an electric cable 1014 passing through a channel made in the DVA device 1010. The strain cable is used as a fail-safe in the event of excessive strain in the hose assembly. The strain cable is an arrestor (a back-up rope) in case the rubber hose breaks and/or the end fittings pull off the hose.

Figure 11:
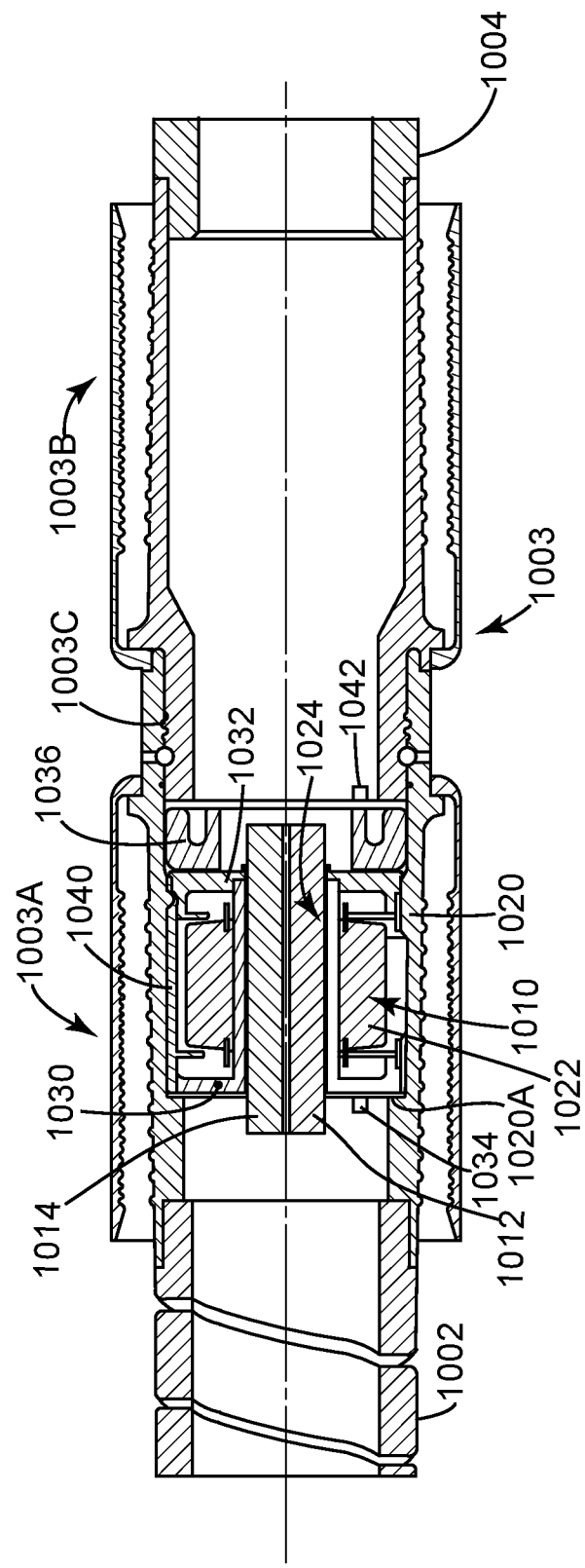
FIG. 11 illustrates an inside structure of the dynamic vibration absorber.

DVA device 1010 is illustrated in more detail in FIG. 11. DVA device 1010 is placed completely inside a housing 1020 of the inter-module connector 1003, i.e., the DVA is associated with a vibration mitigation assembly. In one embodiment, if the DVA device 1010 is not associated with a vibration mitigation assembly, then the housing 1020 belongs to the DVA device 1010, i.e., the DVA device is a standalone device connected, for example, to a bird. If the DVA device has its own housing 1020, the housing has end connectors for being attached between two nodes 1007 of the streamer cable, where a node can be associated with a streamer section, bird, etc.

Figure 12:
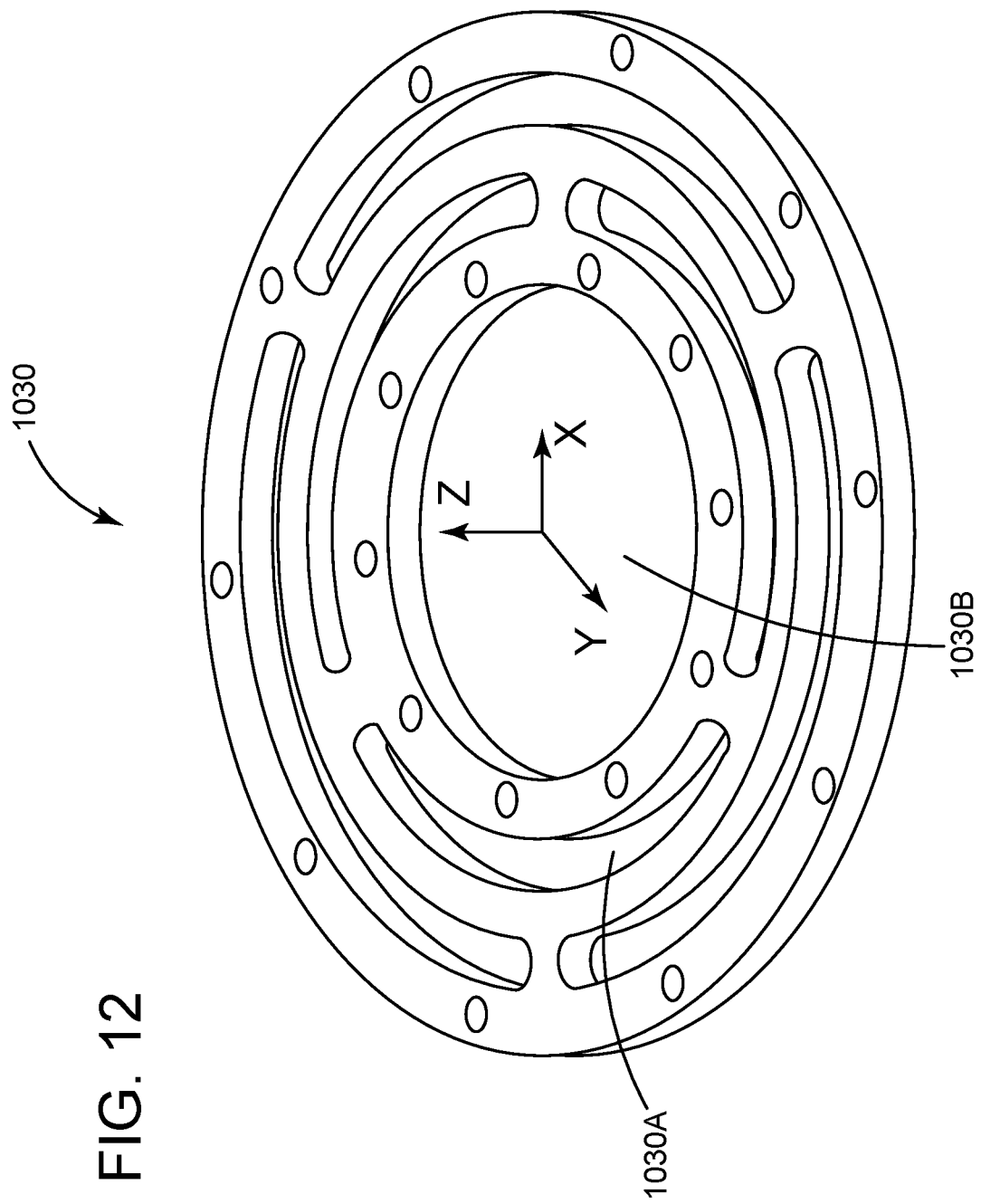
FIG. 12 illustrates a configuration of a diaphragm used in a dynamic vibration absorber.

Returning to FIG. 11, DVA device 1010 has an absorber mass 1022, that has a passing channel 1024 through which various internal cables 1012 and 1014 of the streamer are passing, as also illustrated in FIG. 10B. In one embodiment, the absorber mass 1022 is placed, as discussed later, to not touch any of the cables and/or the housing 1020. The absorber mass 1022 may be made from any material, e.g., plastic, metal or rubber. Absorber mass 1022 is suspended inside the housing 1020 with a suspending diaphragm 1030, which can be made from rubber or plastic. In one embodiment, the suspending diaphragm is made of a homopolymer acetal, e.g., Delrin plastic. The diaphragm 1030 may be located at one end of the absorber mass 1022 while another diaphragm 1032 is located at the other end of the absorber mass 1022. An example of a diaphragm 1030 is shown in FIG. 12. Diaphragm 1030 has various slots 1030A and a central hole 1030B. The central hole 1030B is configured to allow the various cables of the streamer or other elements of the streamer spread to pass through. The number and shape of the various slots 1030A may be changed from diaphragm to diaphragm for providing different elastic constants. While the diaphragm is soft along axis Z, which is perpendicular to the diaphragm, the diaphragm is stiff along the X and Y directions. The X and Y directions define a plane in which the diaphragm extends.

Returning to FIG. 11, one or more diaphragm nuts 1034 and 1036 may be used to fix the absorber mass 1022 to the diaphragms 1030 and 1032. While FIG. 11 shows two diaphragms 1030 and 1032, in one embodiment is possible to use only one diaphragm. A spacer 1040 may be placed between the two diaphragms, for maintaining a given distance between them. A compression nut 1042 may hold the entire device fixed to the housing 1020. Note that FIG. 11 shows the housing having a neck 1020A at one side, for not allowing the diaphragm 1030 to move past the neck while the compression nut 1042 keeps that other diaphragm 1032 in place.

With this arrangement, the absorber mass 1022 can move along direction X (which coincides with the longitudinal axis of the streamer) but not along directions Y and Z, which form a plane perpendicular to the longitudinal axis of the streamer.

Figure 13:
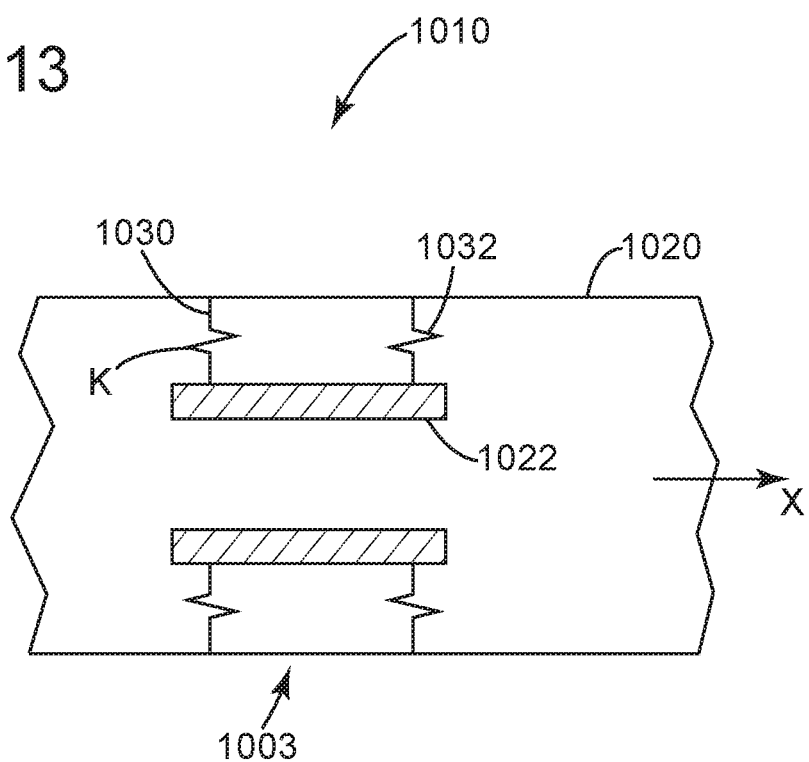
FIG. 13 illustrates a movement of an absorber mass inside the dynamic vibration absorber.

The functionality of the DVA device is now discussed with regard to FIG. 13. This figure schematically illustrates the DVA device 1010 having the absorber mass 1022 and two diaphragms 1030 and 1032 that support the absorber mass inside housing 1020. The two diaphragms 1030 and 1032 behave like coil springs have a given constant spring k. Absorber mass 1022 can oscillate along direction X. As a noise propagates along the streamer and thus, along the inter-module connector 1003 with a resonant frequency which depends on the type of equipment (in this case, the resonant frequency of the vibration mitigation assembly 1000), the absorber mass 1022 vibrates out of phase with the inter-module connector 1003. This means, that when the vibration mitigation assembly 1000 moves to the left along direction X, the DVA mass moves to the right. The force generated by the movement of the absorber mass 1022 subtracts from that of the vibration mitigation assembly 1000, which results in the resonant frequency of the vibration mitigation assembly 1000 being reduced.

Figure 14:
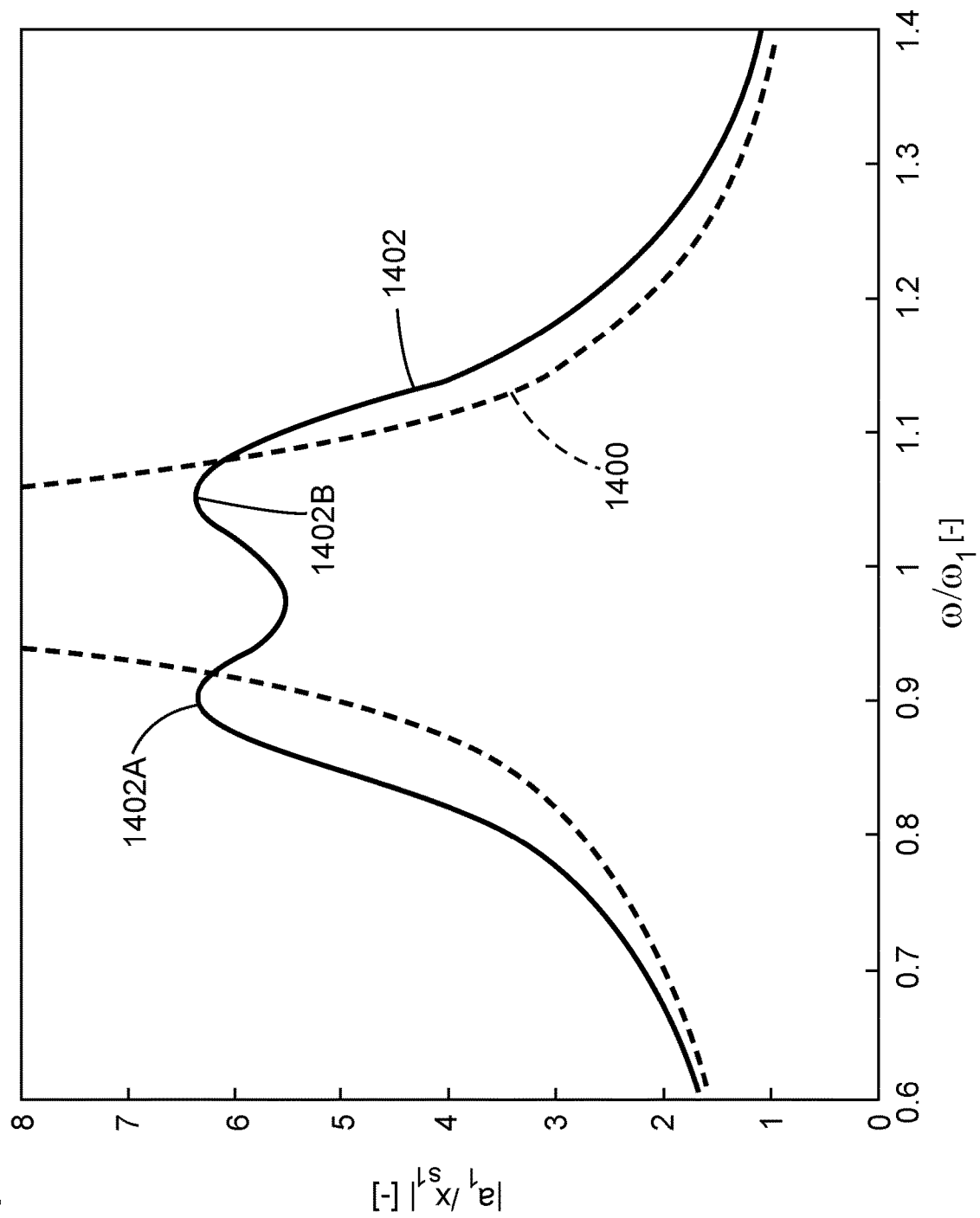
FIG. 14 illustrates a frequency spectrum fora vibration mitigation assembly with and without a dynamic vibration absorber.

In this respect, FIG. 14 shows the noise frequency 1400 for the vibration mitigation assembly 1000 having a resonant frequency peak that is very large. When the DVA device 1010 is added to the inter-module connector 1003 of the vibration mitigation assembly 100, the noise frequency 1402 is reduced, having now two peaks 1402A and 1402B that are much smaller than the original peak of the resonant frequency noise 1400.

In order to achieve this reduction in the passing noise, the absorber mass 1022 needs to be selected in such a way that it is about 20% of the mass of the vibration mitigation assembly. Further, the resonant frequency of the vibration mitigation assembly (or a node to which the DVA device is attached to) needs to be known in order to design the diaphragms 1030 and 1032 to reduce the noise peaks in a desired frequency range. In one application, the DVA device has a target resonance in the 5-20 Hz range.

As the DVA device may be located not only inside the housing 1020 of the inter-module connector 1003, but also between a section of the streamer and a bird, or between any two nodes of the streamer cable, the size and spring constant of the diaphragms need to be adjusted depending on the characteristics of the node to which the DVA device is attached. If this is the case, the operator of the streamer cable would need to remove the compression nut and diaphragm nuts shown in FIG. 11, and replace the two diaphragms 1030 and 1032 with appropriate new diaphragms. In addition, depending on the location of the DVA device, the absorber mass 1022 may be changed. The stiffness of the two diaphragms and the mass of the absorber mass are selected based on the location of the DVA device along the streamer, and the resonant frequency of the equipment to which the DVA device is attached. If the DVA device is a stand along device that is attached to a bird, the mass of the absorber mass is selected to be about 20% of the mass of the bird. The stiffness of the two diaphragms is selected based on the resonant frequency of the bird. If the DVA device is attached to another node, the mass and resonant frequency of that node are used to calculate the mass of the absorber mass and the stiffness of the diaphragms. Note that the stiffness of the diaphragms can be changed by having a different number of slots 1030A formed in the body of the diaphragms. While the above embodiments use diaphragms, those skilled in the art would understand that another spring-like device may be used to suspend the absorber mass relative to a housing so that the absorber mass can oscillate along a longitudinal direction of the streamer.

The disclosed embodiments provide an apparatus and method for cable vibration mitigation using a DVA device. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A vibration mitigation assembly comprising:
   first and second elastic sections, each having a spring rate and adapted to attenuate vibrations in a specified frequency range;
   an inter-module connector configured to connect with a first end to the first elastic section and with a second end to the second elastic section;
   a head-end coupler adapted to couple the first elastic section to a component of an electro-mechanical cable or a tow assembly;
   a tail-end coupler adapted to couple the second elastic section to another component of the electro-mechanical cable or tow assembly; and
   a dynamic vibration absorber device located inside the inter-module connector and configured to generate an oscillation out of phase with a vibration propagating along the vibration mitigation assembly thereby changing a peak at a resonant frequency of the vibration mitigation assembly into two smaller vibration peaks, wherein the dynamic absorber device comprises: an absorber mass, and first and second diaphragms attached to the housing and configured to suspend the absorber mass inside the housing.

2. The assembly of claim 1, wherein the inter-module connector has a first part and a second part connected to each other, the dynamic vibration absorber device being placed in the first part that is intended to be ahead of the second part in a towing direction when a vessel tows the vibration mitigation assembly.

3. The assembly of claim 2, wherein the inter-module connector has a housing and the dynamic vibration absorber device is located completely inside the housing.

4. The assembly of claim 1, wherein the absorber mass oscillates along a longitudinal axis of the vibration mitigation assembly when noise propagates through the vibration mitigation assembly.

5. The assembly of claim 4, wherein the absorber mass moves out of phase with the vibration mitigation assembly.

6. The assembly of claim 1, wherein the absorber mass is selected to be a percent of a mass of the vibration mitigation assembly.

7. The assembly of claim 6, wherein the percent is about 20%.

8. The assembly of claim 1, wherein the first and second diaphragms have slots.

9. A dynamic vibration absorber device for reducing a resonant frequency of a node to which the dynamic vibration absorber device is attached to, the dynamic vibration absorber device comprising:
a housing configured to be attached to the node;
an absorber mass located inside the housing; and
first and second diaphragms attached to the housing and configured to suspend the absorber mass inside the housing,
wherein the dynamic vibration absorber device changes a resonant frequency of the node to two smaller vibration peaks.

10. The device of claim 9, wherein the absorber mass oscillates along a longitudinal axis of the node when noise propagates through the node.

11. The device of claim 9, wherein the absorber mass moves out of phase relative to the node.

12. The device of claim 9, wherein the absorber mass is selected to be a percent of a mass of the node.

13. The device of claim 12, wherein the percent is about 20%.

14. The device of claim 9, wherein the first and second diaphragms have slots.

15. The device of claim 9, wherein the node is a streamer section or a bird or a lead-in cable.

16. A streamer for conducting a seismic survey comprising:
plural sections each comprising at least one sensor component for collecting seismic data;
a node attached ahead, in-between or behind the plural sections; and
a dynamic vibration absorber device for reducing a resonant frequency of the node to which the dynamic vibration absorber device is attached, wherein the dynamic vibration absorber device comprises:
a housing configured to be attached to the node,
an absorber mass located inside the housing, and
first and second diaphragms attached to the housing and configured to suspend the absorber mass inside the housing,
the dynamic vibration absorber device being configured to generate an oscillation out of phase with a vibration propagating along the node thereby changing a peak at a resonant frequency into two smaller vibration peaks.

17. The streamer of claim 16, wherein the absorber mass oscillates along a longitudinal axis of the node when noise propagates through the node.

18. The streamer of claim 16, wherein the absorber mass moves out of phase with the node.

* * * * *